(12) United States Patent
Yoo et al.

(10) Patent No.: US 9,114,524 B2
(45) Date of Patent: Aug. 25, 2015

(54) METHOD OF OPERATING A WEARABLE ROBOT

(75) Inventors: Su Jung Yoo, Gyeonggi-do (KR); Woo Sung Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 384 days.

(21) Appl. No.: 13/529,131

(22) Filed: Jun. 21, 2012

(65) Prior Publication Data

US 2013/0173060 A1     Jul. 4, 2013

(30) Foreign Application Priority Data

Jan. 4, 2012   (KR) .......................... 10-2012-0000796

(51) Int. Cl.
| | | |
|---|---|---|
| *G05B 15/00* | (2006.01) | |
| *G05B 19/00* | (2006.01) | |
| *B25J 9/00* | (2006.01) | |
| *B25J 9/16* | (2006.01) | |

(52) U.S. Cl.
CPC . *B25J 9/0006* (2013.01); *B25J 9/16* (2013.01)

(58) Field of Classification Search
CPC .................................. B25J 9/0006; B25J 9/16
USPC ........ 700/245–264; 318/623, 568.12, 568.16, 318/568.21, 568.22; 414/719, 729
See application file for complete search history.

(56) References Cited

U.S. PATENT DOCUMENTS

| | | | | |
|---|---|---|---|---|
| 5,055,755 A | * | 10/1991 | Ozawa et al. ............. | 318/568.11 |
| 5,523,663 A | * | 6/1996 | Tsuge et al. ............. | 318/568.16 |
| 2005/0222714 A1 | * | 10/2005 | Nihei et al. .................... | 700/264 |
| 2009/0105880 A1 | * | 4/2009 | Okazaki ......................... | 700/258 |
| 2010/0087955 A1 | * | 4/2010 | Tsusaka et al. ............... | 700/245 |

FOREIGN PATENT DOCUMENTS

| | | | |
|---|---|---|---|
| JP | 2000-190261 A | | 7/2000 |
| JP | 2000-218576 A | | 8/2000 |
| JP | 2000218576 A | * | 8/2000 |
| KR | 10-0753557 B1 | | 8/2007 |
| KR | 10-2009-0114830 A | | 11/2009 |

OTHER PUBLICATIONS

English_translation for reference for JP2000218576 Aug. 2000.*

* cited by examiner

*Primary Examiner* — Jason Holloway
*Assistant Examiner* — Rachid Bendidi
(74) *Attorney, Agent, or Firm* — Mintz Levin Cohn Ferris Glovsky and Popeo, P.C.; Peter F. Corless

(57) ABSTRACT

Disclosed herein is a method of obtaining the intended manipulation torque of a user for a wearable robot. The method allows the wearable robot, the motion of each joint of which is operated by a motor and which is capable of measuring a variation in current in the motor of each joint and calculating a torque at each joint, to simply and rapidly extract the intended manipulation torque of the user using both an acceleration value (e.g., measured by an acceleration sensor installed on a gripper), and the current variation of the motor, in a state in which the wearable robot does not know the weight of a weight object to be lifted with the gripper. Accordingly, the wearable robot may be suitably controlled at a comparatively lower cost.

12 Claims, 2 Drawing Sheets

METHOD OF OPERATING A WEARABLE ROBOT

CROSS-REFERENCE TO RELATED APPLICATIONS

The present application claims priority under 35 U.S.C. §119(a) to Korean Patent Application No. 10-2012-0000796 filed on Jan. 4, 2012, the entire contents of which are incorporated herein by reference.

BACKGROUND OF THE INVENTION

1. Field of the Invention

The present invention relates to a method of controlling a wearable robot. More particularly, the present invention relates to technology for controlling the exact motion of a wearable robot by detecting the intended torque of a user that is applied to the wearable robot.

2. Description of the Related Art

In industrial settings, there are many jobs in which high-load/heavy weight objects must be handled. Recently, in order to reduce the load being handled by a worker's body and to enhance the ability of a worker to carrying out work in which such high-load/heavy weight objects are handled, wearable robots have been developed that can easily allow high-load/heavy weight objects to be moved by a wearable robot when a worker puts on the wearable robot and manipulates the robot using only a slight operating force.

Such a wearable robot is typically provided with a gripper, which is used to directly hold and lift an object of a particular weight (hereinafter referred to as a "weight object"), and a handle, which is gripped by the user and used to apply an operating force to the gripper. Many different types of weight objects may be lifted by the gripper. Therefore, the robot is controlled based on the assumption that the weight of the weight object is not known. Accordingly, in order to suitably control the robot based on the operating force applied by the user, an appropriate sensor is typically mounted between the gripper and the handle so that a precise understanding of the intended manipulation torque applied by the user can be obtained by the wearable robot, and the weight of a weight object can be adequately detected, allowing the user to lift and manipulate the weight object via the robot Methods of mounting a force/torque sensor between the gripper and the handle and calculating the intended manipulation torque of the user and the weight of the weight object using the output value of the force/torque sensor are precise. Unfortunately, such a precise force/torque sensor is very expensive, and also increases the weight of the portion of the wearable robot in which the sensor is installed.

Accordingly, there is a need for techniques that allow a wearable robot to be able to precisely extract the intended manipulation torque of the user using a relatively inexpensive and lightweight sensor mounted on the wearable robot.

SUMMARY OF THE INVENTION

The present invention relates to a method of extracting the intended manipulation torque of a user for a wearable robot. In particular, the present invention provides a method of measuring a variation in the current in the motor of each joint of a wearable robot, and calculating a torque at each joint, to simply and rapidly extract the intended manipulation torque of the user using both the value, measured by an acceleration sensor (e.g., an accelerometer) installed on the gripper, and the current variation of the motor, thus enabling the wearable robot to be suitably controlled at a comparatively lower cost.

In one aspect, the present invention provides a method of extracting an intended manipulation torque of a user for a wearable robot, including a) obtaining an actuator torque of the robot that satisfies a dynamic equation of the robot itself; b) moving a weight object held by a gripper of the robot to a predetermined job position set by a controller of the robot; c) calculating an additional torque added by the weight object at the job position when b) is completed, using a variation in the current that is required by each joint of the robot when b) is performed; d) calculating a mass of the weight object using the actuator torque obtained in a), the additional torque calculated in c), and a position of the weight object; e) computing an external force caused by the weight object using both an acceleration measured by an acceleration sensor when a user applies an operating force to a handle of the robot, and then the weight object is moved with the gripper holding the weight object, and the mass calculated in d); f) computing an external force torque caused by a change in the position of the weight object using the external force computed in e); g) when the user applies an intended user torque to the handle in a state in which the weight object is held by the gripper, and then the robot is moved, calculating a total torque required for such a motion using the variation in current required by each joint of the robot; and h) calculating the intended user torque by subtracting the actuator torque of the robot and the external force torque from the total torque calculated in g).

In another aspect, the present invention provides a method of extracting an intended manipulation torque of a user for a wearable robot, including obtaining an actuator torque of the robot in a state in which a weight object is not held; calculating a torque caused by addition of the weight object at a predetermined job position, by using a variation in the current required by each joint of the robot while moving the weight object to the job position; calculating a mass of the weight object using the actuator torque, the torque caused by the addition of the weight object, and a position of the weight object; calculating an external force caused by the weight object and a torque caused by the external force, using both an acceleration, measured by an acceleration sensor (e.g., an accelerometer) when the weight object is moved in a state in which a user applies an operating force to a handle of the robot and a gripper of the robot holds the weight object, and the mass of the weight object; calculating a total torque required for the motion using a variation in current required by each joint of the robot when the robot is moved according to manipulation of the user; and calculating the user intention torque by subtracting the actuator torque of the robot and the torque caused by the external force from the calculated total torque.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
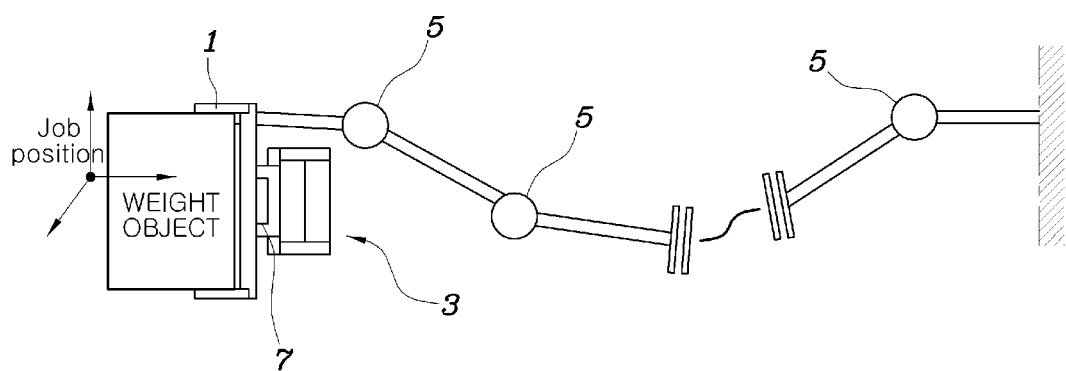
FIG. 1 is a conceptual diagram showing a robot to which an exemplary embodiment of the present invention may be applied.

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. Referring to FIG. 1, a robot to which the present invention may be applied includes a gripper 1 so that it may hold an object having a certain weight (hereinafter referred to as a "weight object"), and a handle 3 configured so that the user may apply an operating force to the robot. Further, in the robot, a plurality of joints 5 may be connected, so that the robot may ultimately be operated according to the intended torque of the user that is applied to the handle 3 in the state in which the gripper 1 holds the weight object via the control of current flowing through motors provided on the joints 5. The robot may then move the weight object in a manner that is proportional to the user's input(s). Illustratively, an acceleration sensor 7 may be mounted between the gripper 1 and the handle 3.

Figure 2:
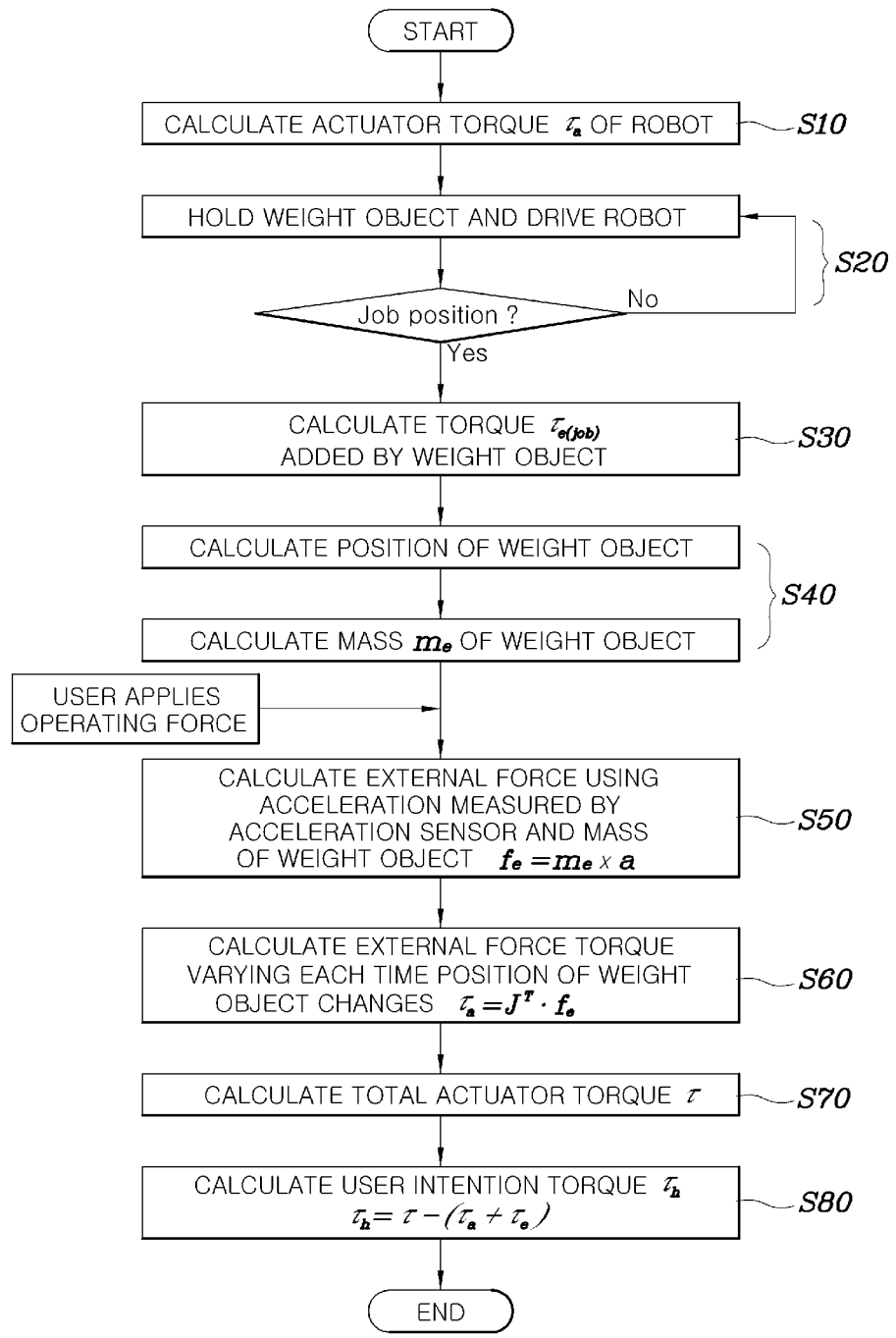
FIG. 2 is a flowchart showing an exemplary embodiment of a method of extracting the intended manipulation torque of a user for a wearable robot according to the present invention. It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

Referring to FIG. 2, an exemplary embodiment of a method of extracting the intended manipulation torque of a user of a wearable robot according to the present invention includes a preprocessing step S10, a preliminary driving step S20, an additional torque calculation step S30, a mass calculation step S40, an external force calculation step S50, an external force torque calculation step S60, a total torque calculation step S70, and an intention torque calculation step S80. In the preprocessing step S10, the actuator torque $\tau_a$ of the robot that satisfies the dynamic equation of the robot itself may be obtained. In the preliminary driving step S20, the weight object is moved to a predetermined job position set by the controller of the robot, with the weight object held by the gripper 1 of the robot. In the additional torque calculation step S30, an additional torque $\tau_{e(job)}$ added by the weight object at the job position when the preliminary driving step S20 is completed is calculated using a variation in the current that is required by the joints of the robot when the preliminary driving step S20 is performed. In the mass calculation step S40, the mass $m_e$ of the weight object is calculated using the actuator torque obtained in the preprocessing step S10, the additional torque calculated in the additional torque calculation step S30, and the position of the weight object. In the external force calculation step S50, an external force caused by the weight object is computed using both acceleration measured by an acceleration sensor (e.g., an accelerometer) when the user applies an operating force to the handle of the robot to move the weight object with the gripper, and the mass calculated in the mass calculation step S40. In the external force torque calculation step S60, a torque $\tau_e$ caused by the external force is computed using the external force computed in the external force calculation step S50. In the total torque calculation step S70, when the user applies an intended user torque to the handle 3 and then the robot is moved to the state in which the weight object is held by the gripper 1, the total torque $\tau$ required for such a motion is calculated using the variation in current required by the joints of the robot. In the intended user torque calculation step S80, an intended user torque $\tau_h$ is calculated by subtracting the actuator torque $\tau_a$ of the robot and the torque $\tau_e$ caused by the external force from the total torque $\tau$ calculated in the total torque calculation step S70.

In other words, the preprocessing step S10 is performed in the state in which the weight object is not held by the gripper 1 of the robot, so that the torque of the actuator based on the specifications and the physical and geometrical characteristics of the robot itself may be obtained. Thereafter, in the state in which any weight object is held by the gripper 1, the preliminary driving step S20, the additional torque calculation step S30, and the mass calculation step S40 may be performed to obtain the mass of the weight object. Furthermore, the external force and the torque attributed to the mass of the object may then also be calculated. Thereafter, when the user applies the operating force to the handle 3, the torque intended to be applied by the user is calculated via the total torque calculation step S70 and the intended torque calculation step S80.

According to a preferred embodiment, the method may be configured such that once the preprocessing step S10 has been separately and previously performed, the intended user torque may be calculated by performing only the procedure after the preliminary driving step S20 whenever the gripper 1 holds different weight objects.

The dynamic equation in the preprocessing step S10 may be represented by the following Equation (1), which indicates the relationship that is formed by the functions of inertia, friction, and gravity at each part of the robot, depending on the variation in the angle of each joint of the robot, and by the actuator torque in the state in which the weight object is not held by the gripper 1 of the robot, Equation (1)

$$M_a \ddot{q} + C_a(q, \dot{q}) + G_a(q) = \tau_a \qquad (1)$$

where $M_a$ is: inertia based on the robot's own design;
$C_a$ is: friction caused by the centrifugal force at each joint based on the robot's own design;
$G_a$ is: gravity based on the robot's own design
$\tau_a$: actuator torque; and
q is: angle of the joint.

In the above Equation (1), the terms representing inertia and gravity are determined by the robot's own design. The term representing friction indicates a value determined by experimentation, and the actuator torque is calculated by the variation in the current of each joint required to drive the robot so that the dynamic equation is satisfied in the state in which the weight object is not held by the gripper 1.

The job position in the preliminary driving step S20 is generally a position spaced apart from the initial position at which the controller of the robot holds the weight object, and may preferably be set to a position at which a variation in torque required by the robot due to the weight object may be suitably detected. As the job position, a point located above, and to the side of the initial position at which the weight object is held is generally selected. Therefore, in the preliminary driving step S20, a perpendicular displacement, influenced most by the addition of the weight object, may be formed, and the preliminary driving step S20 may be promptly completed.

The additional torque calculation step S30 may be configured to calculate the additional torque $\tau_{e(job)}$, added by the weight object, by using the current variation that occurs in the joint, or joints, of the robot in the state in which the preliminary driving step S20 has been completed, and the controller of the robot completes the process of moving the gripper towards the job position.

The mass calculation step S40 may be configured to calculate the position of the weight object using a geometrical calculation based on the stationary posture of the robot at the job position, and to calculate the mass of the weight object by the following Equation (2):

$$M_{a,e}\ddot{q}+C_{a,e}(q,\dot{q})+G_{a,e}(q)-\tau_a=\tau_{e(job)} \qquad (2)$$

where $M_{a,e}$ is: inertia based on the robot's own design and the weight object;

$C_{a,e}$ is: friction based on the robot's own design and the centrifugal force at each joint that occurs due to the weight object;

$G_{a,e}$ is: gravity based on the robot's own design and the weight object;

$\tau_a$ is: actuator torque;

$\tau_{e(job)}$ is: additional torque caused by the weight object at the job position; and q is: angle of the joint.

Illustratively, the actuator torque $\tau_a$ and the additional torque $\tau_{e(job)}$ caused by the weight object at the job position may have been previously obtained in the preprocessing step S10 and the additional torque calculation step S30, respectively. The terms representing inertia and friction become 0 because the robot is in a stationary job position after having performed the preliminary driving step S20 and then the variation in the angle of each joint is given by '0'. As a result, since only the term representing gravity remains, the distance based on the position of the weight object may be obtained based on the geometric position of the robot, and then the mass of the weight object may be calculated.

For example, the state in which the preliminary driving step S20 is completed may be a state in which the weight object does not substantially reach the job position originally targeted by the controller of the robot. That is, the controller of the robot may complete the preliminary driving step S20 by providing current to the motor of each joint, which is required to reach the targeted job position using the actuator torque determined in the preprocessing step S10 in the state in which the mass of the weight object is not known. Therefore, since the position of the robot does not actually reach the exact job position due to the weight object, the position of the weight object is calculated using the geometrica position relationship of the robot in which the preliminary driving step S20 has been completed.

As described above, when the mass $m_e$ of the weight object held by the gripper of the robot is known, the intended user torque $\tau_h$ may be obtained by means of the following steps when the user applies the operating force to the handle and the robot is operated. For example, when the user applies an operating force to the handle and then the weight object is moved, the acceleration a of the weight object is measured by the acceleration sensor in the external force calculation step S50, and the mass $m_e$ of the weight object calculated in the mass calculation step S40 is multiplied by the acceleration a, so that the external force $f_e$ applied by the weight object may be calculated.

The external force torque calculation step S60 is configured to multiply a Jacobian transpose $J^T$ specifying the relationship among the positions of the joints of the robot by the external force $f_e$ caused by the weight object calculated in the external force calculation step S50, thus calculating the external force torque $\tau_e$ that varies each time the position of the weight object changes.

That is, the additional torque $\tau_{e(job)}$ added by the weight object in the additional torque calculation step S30 may be calculated in the state at which the weight object is located at the job position. The external force torque $\tau_e$ in the external force torque calculation step S60 is a torque caused by the external force applied by the weight object at second position once the weight object is moved and leaves the job position.

The intended torque calculation step S80 may be configured to calculate the intended torque applied by the user to drive the robot by the following Equation (3):

$$\tau_h=\tau-\tau_a-\tau_e \qquad (3)$$

where $\tau_h$ is: user intention torque;

$\tau$ is: total torque;

$\tau_a$ is: actuator torque; and $\tau_e$ is: external force torque varying at each time the position of the weight object changes In this case, the total torque $\tau$ is obtained in the total torque calculation step S70, and refers to the total torque that is applied by the actuator and is required by each joint of the robot when the user applies the operating force to the handle 3 of the robot and then the weight object is moved by the gripper 1. The total torque $\tau$ includes the actuator torque $\tau_e$ applied to drive only the robot itself, the external torque $\tau_e$ caused by the external force applied as the weight object is added, and the intended user torque $\tau_h$. Therefore, only the intended torque $\tau_h$ of the user may be obtained by subtracting the actuator torque $\tau_a$ and the external force torque $\tau_e$ caused by the weight object from the total torque $\tau$.

As described above, the present invention may provide a method of obtaining the intended manipulation torque of a user for a wearable robot, which allows the wearable robot to simply and rapidly obtain the intended manipulation torque of the user using both the value, measured by an acceleration sensor installed on a gripper, and the variation of current in the joint motor(s), in a state in which the wearable robot does not know the weight of a weight object to be lifted with the gripper, thus enabling the wearable robot to be suitably controlled at a comparatively lower cost.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of obtaining a manipulation torque for a wearable robot, comprising the steps of:
   providing the wearable robot that includes at least one arm with one or more joints and a gripper, and a control handle;

obtaining, by a control unit of the wearable robot, an actuator torque value of the robot;

moving, by the gripper of the robot, an object to a predetermined position set by the control unit;

calculating, at the control unit, an additional torque value added by the object at the position when the step of moving the object is completed, wherein the additional torque value is calculated using a variation in a current required by each of the one or more joints of the at least one arm of the robot when the step of moving the object is performed, relative to the current required by each of the one or more joints of the at least one arm of the robot in the step of obtaining the actuator torque value of the robot;

calculating, by the control unit, a mass of the object using the actuator torque value obtained in the step of obtaining the actuator torque value of the robot, the additional torque calculated in the step of calculating the additional torque value, and a position of the object;

computing, by the control unit, an external force value caused by the object based on an acceleration detected by an acceleration sensor when the object is moved by the gripper and the mass calculated in the step of calculating the mass of the object;

computing, by the control unit, an external force torque value caused by a change in the position of the object using the external force value computed in the step of computing the external force value;

calculating, by the control unit, a total torque value to move the object using the variation of the current required at each joint of the robot when the robot moves with an initial torque value added to the handle by a user while the gripper holds the object; and calculating, by the control unit, an intended torque value by subtracting the actuator torque value of the robot and the external force torque value from the total torque value calculated in the step of calculating the total torque value.

2. The method according to claim 1, wherein the control unit calculates the actuator torque value as:

$$M_a \ddot{q} = C_a(q, \dot{q}) = G_a(q) = \tau_a,$$

where $\tau_a$ denotes the actuator torque value, $M_a$ denotes inertia based on the robot's design, $C_a$ denotes friction caused by a centrifugal force at each joint based on the robot's design, $G_a$ denotes gravity based on the robot's design, and q denotes the angle of the joint.

3. The method according to claim 1, wherein the job position in the step of moving the object is spatially distinct from an initial position at which the arm of the robot holds the object.

4. The method according to claim 3, wherein the spatial distinction between the initial position and the job position allows the variation in the torque required by the robot due to the object to be suitably sensed.

5. The method according to claim 1, wherein calculating in the step of calculating the mass of the object further comprises:

calculating the position of the object using a geometrical calculation based on a posture of the robot that is stationary at the job position; and calculating the mass of the object as:

$$M_{a,e} \ddot{q} + C_{a,e}(q, \dot{q}) + G_{a,e}(q) - \tau_a = \tau_{e(job)}$$

where $M_{a,e}$ denotes inertia based on the robot's own design and the object, $C_{a,e}$ denotes friction based on the robot's own design and a centrifugal force at each joint occurring due to the object, $G_{a,e}$ denotes gravity based on the robot's own design and the object, $\tau_a$ denotes the actuator torque value, $\tau_{e(job)}$ denotes the additional torque value, and q denotes the angle of the joint.

6. The method according to claim 1, wherein step of computing the external force torque value further comprises:

computing the external force torque value that varies each time the position of the object changes by multiplying a Jacobian transpose specifying a relationship among positions of each of the one or more joints of the robot by the external force value in the step of computing the external force value.

7. The method according to claim 1, wherein the step of calculating the intended torque value further comprises:

calculating the intended torque value applied by the user as:

$$\tau_h = \tau - \tau_a - \tau_e$$

where $\tau_h$ denotes the intended user torque value, $\tau$ denotes the total torque value, $\tau_a$ denotes the actuator torque value, and $\tau_e$ denotes the external force torque value.

8. The method according to claim 1, wherein the acceleration value in the step of calculating the additional torque value is measured with an accelerometer.

9. The method according to claim 8, wherein the accelerometer is located between any of the one or more joints and the gripper.

10. A method of obtaining an intended manipulation torque of a user for a wearable robot, comprising:

providing the wearable robot that includes at least one arm with one or more joints and a gripper, and a control handle;

obtaining, by a controller of the wearable robot, an actuator torque value of the robot in a state in which an object is not held;

calculating, by the controller, an additional torque value added by the object at a predetermined position, wherein the additional torque value is calculated using a variation in a current required by each of the one or more joints of the robot while moving the object to the position;

calculating, by the controller, a mass of the object using the actuator torque value, the additional torque value, and a position of the object;

calculating, by the controller, an external force caused by the object and a torque value caused by the external force, using both an acceleration value measured by an acceleration sensor when the object is moved in a state in which a user applies an operating force to the control handle of the robot and the gripper holds the object, and the mass of the object;

calculating, by the controller, a total torque value to move the object using the variation of the current required at each joint of the robot when the robot moves with an initial torque value added to the handle by a user while the gripper holds the object; and calculating, by the controller, an intended user torque by subtracting the actuator torque value of the robot and the torque value caused by the external force from the calculated total torque value.

11. The method according to claim 10, wherein the acceleration sensor is an accelerometer.

12. A non-transitory computer readable medium containing program instructions executed by a processor or controller, the computer readable medium comprising:

program instructions that obtain an actuator torque value from a control unit of a wearable robot that includes at least one arm with one or more joints and a gripper, and a control handle;

program instructions that calculate an additional torque value relative to the actuator torque value based an amount of current required by one or more joints of one or more arms of the robot to move the object to a predetermined position;

program instructions that calculate a mass of the object using the actuator torque value, the additional torque value, and the position of the object;

program instructions that compute an external force caused by the object and a torque value caused by the external force, using both an acceleration value measured by an acceleration sensor when the weight object is moved in a state in which a user applies an operating force to the control handle of the robot and the gripper holds the weight object, and the mass of the weight object;

program instructions that calculate a total torque value to move the object using a variation of the current required at each joint of the robot when the robot moves with an initial torque value added to the handle by a user while the gripper holds the object; and program instructions that calculate an intended torque value by subtracting the actuator torque value and the external force torque value from the total torque value.

* * * * *